United States Patent [19]

Katayama et al.

[11] Patent Number: 5,592,385
[45] Date of Patent: Jan. 7, 1997

[54] VEHICLE CRUISE CONTROL SYSTEM WITH VOICE COMMAND

[75] Inventors: Kazuyori Katayama; Yasuo Naito, both of Himeji, Japan

[73] Assignee: Mitsubishi Denki Kabushiki Kaisha, Tokyo, Japan

[21] Appl. No.: 555,311

[22] Filed: Nov. 8, 1995

Related U.S. Application Data

[63] Continuation of Ser. No. 305,898, Sep. 14, 1994, abandoned.

[30] Foreign Application Priority Data

Sep. 20, 1993 [JP] Japan ..................... 5-233593

[51] Int. Cl.⁶ .................. B60K 31/00; G10L 5/06
[52] U.S. Cl. ................... 364/426.041; 364/460; 395/2.55
[58] Field of Search ................. 364/426.04, 424.05; 395/460, 2, 2.55, 2.6, 2.7, 2.84; 381/86, 41, 42, 43, 51; 180/170

[56] References Cited

U.S. PATENT DOCUMENTS

| | | | |
|---|---|---|---|
| 4,419,730 | 12/1983 | Ito et al. | 364/424.05 |
| 4,501,012 | 2/1985 | Kishi et al. | 381/43 |
| 4,506,377 | 3/1985 | Kishi et al. | 381/41 |
| 4,528,687 | 7/1985 | Noso et al. | 395/2.84 |
| 4,593,403 | 6/1986 | Kishi et al. | 381/110 |
| 4,622,636 | 11/1986 | Tachibana | 364/424.05 |
| 4,650,020 | 3/1987 | Mizuno et al. | 180/176 |
| 4,763,746 | 8/1988 | Ochiai | 180/179 |
| 4,797,924 | 1/1989 | Schnars et al. | 395/2.85 |
| 5,165,497 | 11/1992 | Chi | 180/169 |
| 5,193,141 | 3/1993 | Zwern | 395/2 |
| 5,203,423 | 4/1993 | Fujiwara et al. | 364/426.01 |
| 5,245,694 | 9/1993 | Zwern | 340/426 |

FOREIGN PATENT DOCUMENTS

| | | |
|---|---|---|
| 58-39311 | 3/1983 | Japan . |
| 265749 | 11/1988 | Japan . |

*Primary Examiner*—Kevin J. Teska
*Assistant Examiner*—Tan Q. Nguyen
*Attorney, Agent, or Firm*—Sughrue, Mion, Zinn, Macpeak & Seas

[57] ABSTRACT

A vehicle cruise control system includes a voice instruction inputting element 11. A driver inputs a desired voice instruction, which is digitally compared with several previously recorded voice instructions to identify the input instruction and alter the vehicle speed, cancel or resume the cruise control, etc. Manual control switch manipulation is thus avoided.

3 Claims, 18 Drawing Sheets

VEHICLE CRUISE CONTROL SYSTEM WITH VOICE COMMAND

This is a Continuation of application Ser. No. 08/305,898 filed Sep. 14, 1994 now abandoned.

BACKGROUND OF THE INVENTION

1. Field of the Invention

The present invention relates to a vehicle running control system, particularly to a vehicle running control system capable of easily and reliably altering the control mode or set points.

2. Description of the Related Art

For example, a conventional vehicle running control system is disclosed in Japanese Patent Laid-Open No. 58-39311. FIG. 19 is a schematic diagram illustrating a configuration of such a control system. In this figure, a set switch 1 is operated by a driver to issue an instruction indicating that a constant-speed running control process should be started. A cancel switch 2 is operated by a driver via a brake (not shown) to cancel the constant-speed running mode. A speed sensor 3 detects the running speed of a vehicle (not shown) and outputs a pulse train signal having a frequency proportional to the running speed. A main switch 5 acts as a power switch for supplying electric power from a battery 4 installed in the vehicle to a controller 6. The controller 6 gets in operation when the main switch 5 is turned on. The controller 6 includes a processor 6a such as a microcomputer for performing automatic control such that the running speed of the vehicle is maintained at a target speed V. According to input signals provided by the set switch 1, cancel switch 2 and speed sensor 3, the, controller 6 performs various processing, and outputs various control signals to a motor-driven throttle actuator 7 thereby performing automatic control. The throttle actuator 7 is disposed in an air inlet pipe 8 to control an opening (i.e., degrees of opening) of a throttle valve according to the control signal provided by the controller 6. The throttle actuator 7 controls the extent of opening of the throttle valve 9 in response to the operation of an accelerator pedal (not shown). The throttle actuator 7 is connected to the controller 6 so that it can also receive various control signals from the controller 6.

In addition to the functions provided in the conventional vehicle running control system shown in FIG. 19, another known vehicle running control system also has a vehicle-to-vehicle distance sensor (not shown) which detects a distance from a vehicle equipped with the distance sensor to a preceding vehicle running ahead, and performs automatic control based on the detected vehicle-to-vehicle distance to maintain the actual vehicle-to-vehicle distance at a target value.

In the vehicle running control system which performs automatic control on the opening of the throttle valve such that a vehicle runs at a target speed, there is provided a function for increasing or reducing the target speed without treading on an accelerator pedal. This function is accomplished by turning on manual switches called a resume/acceleration switch and a set/coast switch. When this function is in operation, the running speed is increased or decreased gradually independent of the target speed, and the target speed stored in memory is updated to a current running speed from moment to moment.

FIG. 20 is a time chart illustrating a gradual increase in the current running speed V1 during a time period in which the resume/acceleration switch is in an on-state. In FIG. 20, when the resume/acceleration switch is turned off, the running speed V2 at that time is stored in memory as the target speed. After that time, feedback control is done employing the running speed V2 as the target speed. However, the running speed overshoots up to V3 due to mechanical inertia. FIG. 21 is a time chart illustrating a gradual decrease in the current running speed V4 during a time period in which the set/coast switch is in an on-state. In FIG. 21, the running speed is V5 when the set/coast switch is turned off. However, the running speed undershoots to V6 due to mechanical inertia.

In the conventional vehicle running control system, as described above, to change the running speed by increasing or decreasing the target speed without treading on an accelerator pedal, it is required to turn on the manual switches called a resume/acceleration switch and set/coast switch. To do that, it is required to select correct switches from a plurality of switches disposed at various locations in a vehicle. Thus, this action distracts driver's attention from the view ahead, though for a rather short time. Furthermore, as shown in FIGS. 20 and 21, when the resume/acceleration switch or the set/coast switch is turned off, the change in the running speed cannot stop immediately due to mechanical inertia, and thus overshooting or undershooting occurs before the speed settles down to the running speed stored in the memory. Therefore, this type of conventional vehicle running control system gives the driver feeling of inconvenience, danger, unpleasantness, and shock.

SUMMARY OF THE INVENTION

It is an object of the present invention to solve the above problems. More specifically, it is an object of the present invention to provide a vehicle running control system which can be dealt with in more convenient and comfortable manner in alteration of control items or set points.

According to one aspect of the invention, there is provided a vehicle running control system comprising: cruise control means for driving a vehicle to cruise at a constant speed; vehicle-to-vehicle distance control means for maintaining a distance from the vehicle to a preceding vehicle at a substantially constant value in preference to the cruise control performed by the cruise control means; and voice instructing means for registering in advance at least one voice instruction issued by a driver and for altering control contents of the cruise control means and the vehicle-to-vehicle distance control means in response to a previously registered voice instruction issued by the driver.

According to another aspect of the invention, there is provided a vehicle running control system comprising: target speed setting means for setting a target speed of a vehicle; running speed detecting means for detecting a running speed of the vehicle as an actual running speed; throttle opening control means for controlling an opening of a throttle valve depending on a deviation of the actual running speed from the target speed; acceleration voice-instructing means for registering in advance a driver's acceleration voice command as an acceleration instruction and for directing, in response to a driver's acceleration voice command as registered, the throttle opening control means to control the opening of the throttle valve so that the actual running speed increases gradually; and acceleration-termination voice-instructing means for registering in advance a driver's acceleration-termination voice command as an acceleration-termination instruction and for directing, in response to a driver's acceleration-termination voice command as registered, the target speed setting means to set, as a new target speed, the actual running speed detected when the driver's acceleration-termination voice command has been input.

According to a further aspect of the invention, there is provided a vehicle running control system comprising: target speed setting means for setting a target speed of a vehicle; running speed detecting means for detecting a running speed of the vehicle as an actual running speed; throttle opening control means for controlling an opening of a throttle valve depending on a deviation of the actual running speed from the target speed; deceleration voice-instructing means for registering in advance a driver's deceleration voice command as an deceleration instruction and for directing, in response to a driver's deceleration voice command as registered, the throttle opening control means to control the opening of the throttle valve so that the actual running speed decreases gradually; and deceleration-termination voice-instructing means for registering in advance a driver's deceleration-termination voice command as an deceleration-termination instruction and for directing, in response to a driver's deceleration-termination voice command as registered, the target speed setting means to set, as a new target speed, the actual running speed detected when the driver's deceleration-termination voice command has been input.

According to a still further aspect of the invention, there is provided a vehicle running control system comprising: target speed setting means for setting a target speed of a vehicle; running speed detecting means for detecting a running speed of the vehicle as an actual running speed; throttle opening control means for controlling an opening of a throttle valve depending on a deviation of the actual running speed from the target speed; and target-speed designation voice-instructing means for registering in advance a driver's target-speed designation voice command as a target-speed designation instruction, and for directing, in response to a driver's target-speed designation voice command as registered, the target speed setting means to set, as a new target speed, a value designated by the driver's target-speed designation voice command.

In a preferred form, the vehicle running control system further comprises voice registering means for registering voice commands of a plurality of drivers.

In another preferred form, the vehicle running control system further comprises identification means for identifying driver's voices based on the registered voice commands.

In a further preferred form, the vehicle running control system further comprises identification means for identifying driver's voice commands based on signals provided by external input operations of the respective drivers.

In the vehicle running control system according to the present invention, control commands can be input via driver's voice, in addition to or in place of a conventional input method using switches. According to the present invention, therefore, it is possible to alter the control mode or setting points without distracting driver's attention from the view ahead even for a rather short time, and without giving the feeling of danger or unpleasantness to the driver.

Furthermore, in the vehicle running control system according to the present invention, the target speed can be increased merely by a corresponding voice instruction of the driver.

Similarly, in the vehicle running control system according to the present invention, the target speed can also be decreased merely by a corresponding voice instruction.

In the vehicle running control system according to the present invention, not only the target speed can be increased and decreased merely by corresponding voice instructions of the driver, but overshooting or undershooting of the actual vehicle speed can be positively avoided because the target speed can be known in advance.

Furthermore, in the vehicle running control system according to the present invention, voice registering means allows the system to identify voices of a plurality of drivers.

In the vehicle running control system according to the present invention, drivers can be identified according to voice inputs, and therefore the number of comparison operations associated with registered voices can be reduced.

In the vehicle running control system according to the present invention, a driver can also be designated by an external inputting operation such as switching operation of the driver, whereby the number of comparison operations associated with registered voices can be reduced.

DESCRIPTION OF THE PREFERRED EMBODIMENTS

EMBODIMENT 1

Referring to the accompanying drawings, embodiments of the present invention will be described below.

Figure 1:
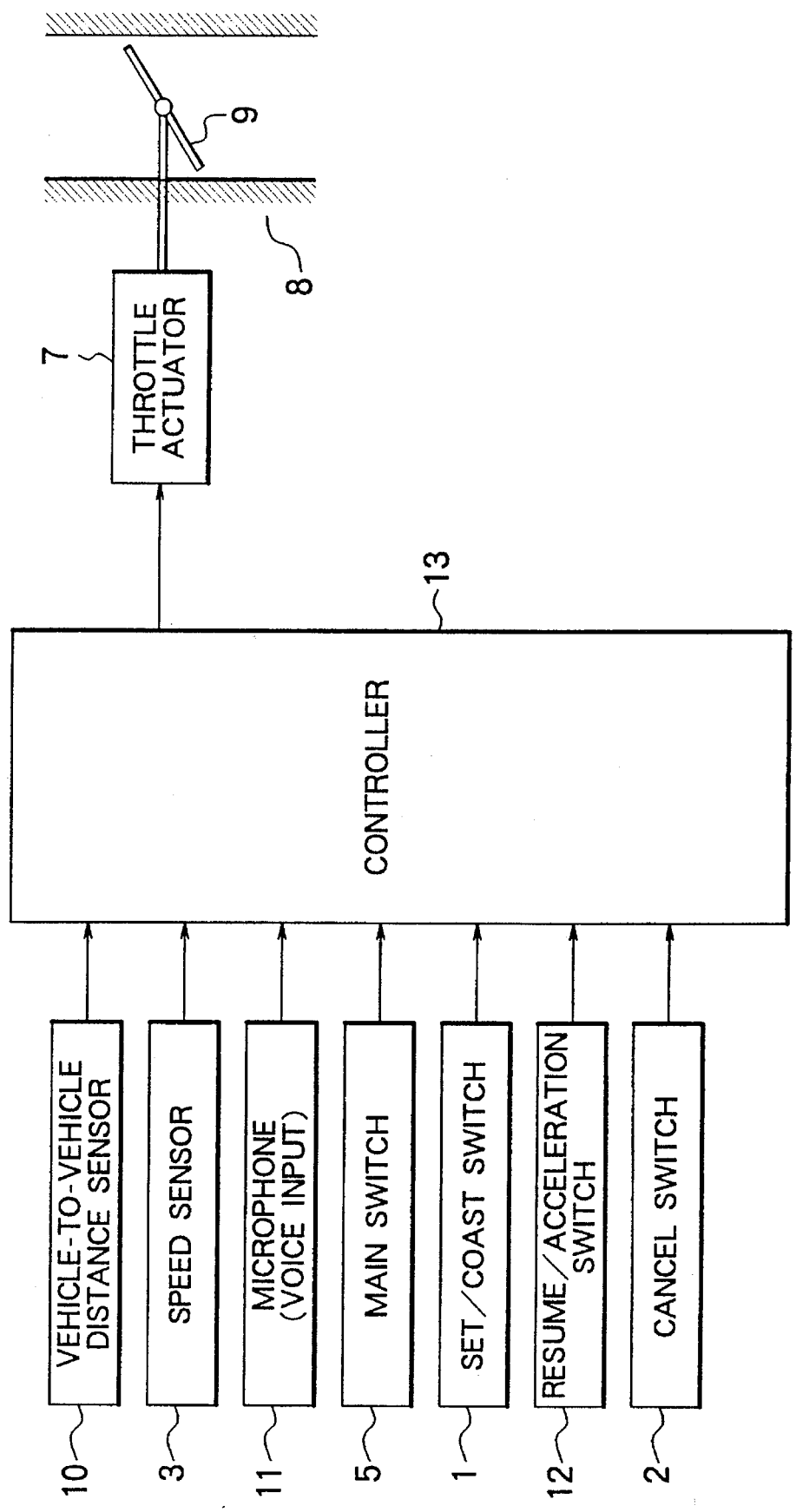
FIG. 1 is a block diagram illustrating a first embodiment according to the present invention.

FIG. 1 illustrates the configuration of a first embodiment of a vehicle running control system according to the present invention. The vehicle running control system has a controller 13 which has inputs connected to a set/coast switch 1, cancel switch 2, speed sensor 3, main switch 5, a vehicle-to-vehicle distance sensor 10, microphone 11 and resume/acceleration switch 12, respectively. The speed sensor 3 acts as running speed detecting means for detecting a running speed of a vehicle. The vehicle-to-vehicle distance sensor 10 acts as vehicle-to-vehicle distance detecting means for detecting the distance between a vehicle equipped with the vehicle running control system of the present invention and another vehicle running ahead. The microphone 11 is used to input voice instructions registered in advance as instructions for altering control mode or set points. The main switch 5 is used to supply electric power to the control system. The set/coast switch 1 is a manual switch for setting a target speed or directing the controller to reduce the speed. The resume/acceleration switch 12 is a manual switch for directing the controller to perform automatic returning process to the target speed or directing it to increase the speed. The cancel switch 2 is used to direct the controller to cancel a constant-speed running control mode or cruise control mode. The controller 13 performs running control of a vehicle according to input signals given via the set/coast switch 1, cancel switch 2, speed sensor 3, main switch 5, vehicle-to-vehicle distance sensor 10, microphone 11, and resume/acceleration switch 12. A throttle valve 9 is disposed in an air inlet pipe 8 of a vehicle engine to adjust the amount of air introduced into the air inlet pipe 8. The throttle valve 9 is linked to a throttle actuator 7 so that the throttle actuator 7 can drive the throttle valve 9 in response to a driving signal provided by the controller 13. Thus, the controller 13 forms target speed setting means of the present invention.

Figure 2:
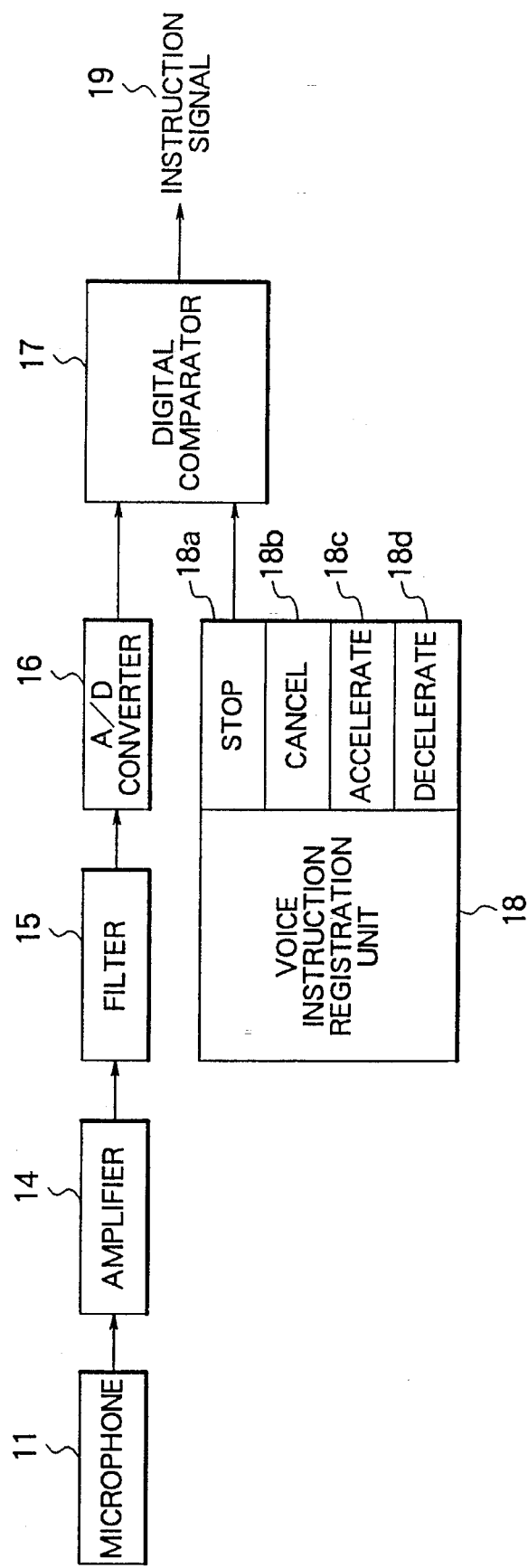
FIG. 2 is a block diagram illustrating the details of the first embodiment of a voice recognition unit according to the present invention.

FIG. 2 is a block diagram illustrating a voice recognition unit. This voice recognition unit operates as follows. First, the main switch 5 shown in FIG. 1 is turned on so that electric power is supplied to the controller 13, and thus the system starts operation. If the set/coast switch 1 is manually turned off, both target speed and actual running speed detected by the speed sensor 3 are input to the controller 13, and the controlling amount is determined from the deviation of the actual running speed from the target speed. The opening of the throttle valve 9 is controlled via the throttle actuator 7 according to the above controlling amount, so that the vehicle runs at the target speed in an automatic running mode. This control mode can be canceled by operating the cancel switch 2.

In this state, if a voice instruction registered as the "STOP" command is input to the controller 13 via the microphone 11, the controller 13 stores the actual running speed detected by the speed sensor 3 as a new target speed. After that time, the controller 13 determines the controlling amount required to perform constant-speed running at the new target speed, and outputs the determined controlling amount to the throttle actuator 7. According to the controlling amount, the throttle actuator 7 drives the throttle valve 9 to have a proper opening to maintain the actual running speed at the target speed. This control mode is canceled if a voice instruction registered as the "CANCEL" command is input to the controller 13 via the microphone 11.

Referring to FIG. 2, operations according to voice instructions will be described. If a driver (not shown) issues one of registered voice instructions (registered in a voice instruction registration unit 18), for example a voice instruction indicating "STOP" via the microphone 11, the corresponding input signal is amplified by an amplifier 14 and then only signal components in a useful frequency range are extracted by a filter 15. These signal components are converted to a digital signal by an analog-to-digital converter 16.

At least one voice instruction is registered in the voice instruction registration unit 18 in digital form. In the present embodiment, the registered voice instructions include for example "STOP" 18a, "CANCEL" 18b, "ACCELERATE" 18c, "DECELERATE" 18d. In a digital comparator 17, the input signal obtained by converting the voice instruction given by the driver into the digital signal via the microphone 11, amplifier 14, filter 15, and analog-to-digital converter 16 is compared with the above-described one or more registered data 18a through 18d registered in the voice instruction registration unit 18 one after another. The data identical to the input signal is identified as the voice instruction 19 to be carried out, and a corresponding instruction signal is output.

For example, if the driver issues a voice instruction indicating "STOP" via the microphone 11, the input signal is converted into digital form and then compared with each of four digital values registered in the voice instruction registration unit 18. In this case, "STOP" 18a is identical to the given input signal, and thus a "STOP" instruction signal is output as the voice instruction to be carried out. If "CANCEL" is issued as a voice instruction, the input signal is converted into digital form and then compared with each of four digital values registered in the voice instruction registration unit 18. In this case, since "CANCEL" 18b is identical to the given input signal, a "CANCEL" instruction signal is output as the voice instruction to be carried out. When "ACCELERATE" or "DECELERATE" is issued, the operation is carried out in a similar manner. There are various known techniques for converting a voice signal into digital form (voice coding techniques) such as techniques according to PCM, ADPC, etc. There are also various known techniques of voice recognition (digital comparator) such as techniques according to spectrum distance measure, FFT, correlation function, etc. Any of these techniques can be used in the present invention.

Figure 3:
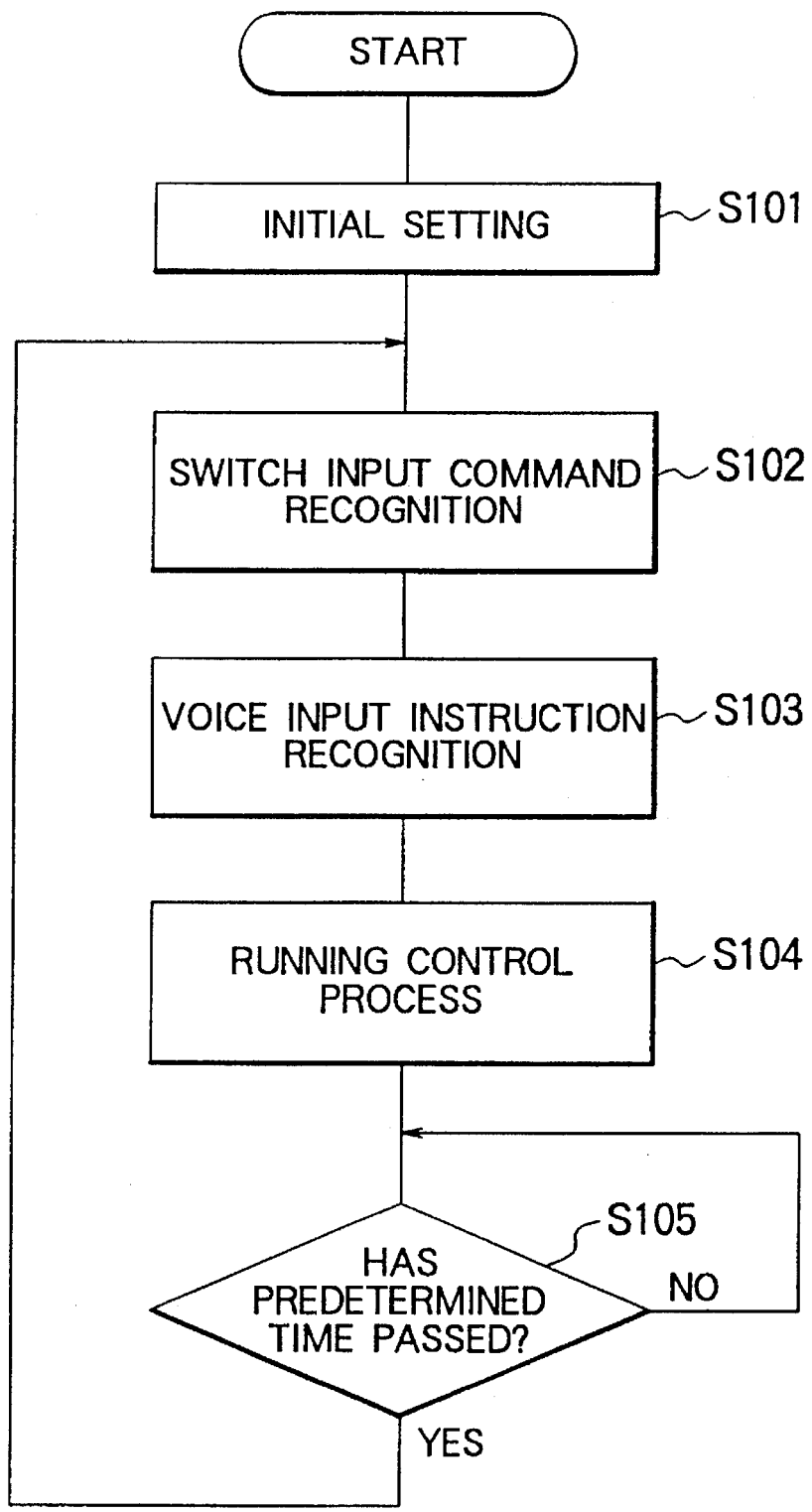
FIG. 3 is a flow chart regarding the first embodiment according to the present invention.

FIG. 3 is a flow chart illustrating the operation of the above-described voice recognition unit. At step S101, initial setting associated with the controller 13 is carried out. At step S102, it is determined whether a driver (not shown) has performed manual operation on the set/coast switch 1 or resume/acceleration switch 12. At step S103, it is determined whether the driver (not shown) has issued any voice instruction. At step S104 of running control process step, a correct control mode corresponding to the decision results obtained at steps S102 and S103 is selected, and the throttle valve 9 is controlled via the throttle actuator 7 so that the opening of the throttle valve 9 is maintained at an optimum value. In step S105, if a predetermined time has elapsed, then the process returns to step S102, and the above process will be carried out repeatedly.

Figure 4:
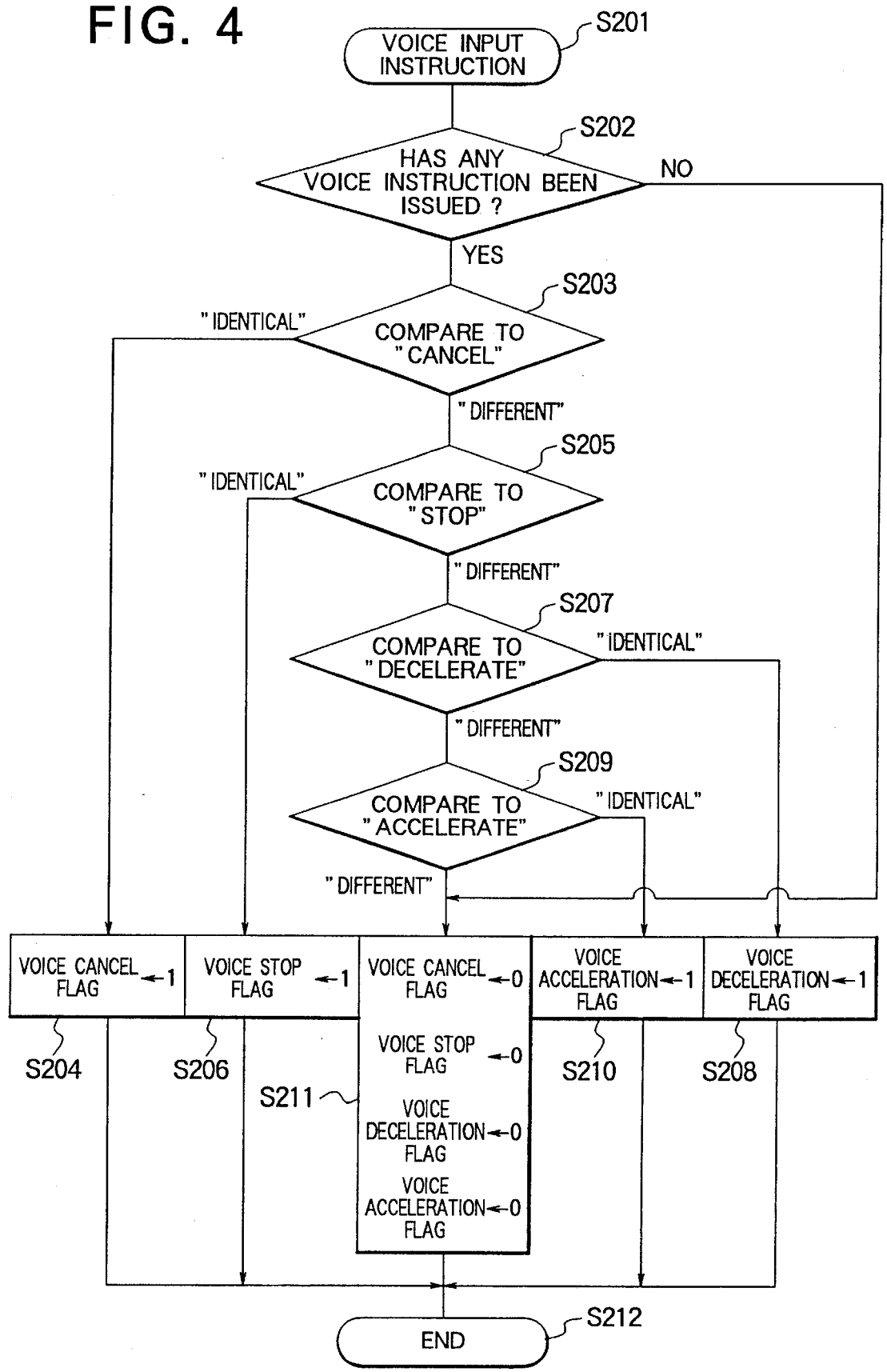
FIG. 4 is a detailed flow chart illustrating the voice instruction input recognition process in the first embodiment according to the present invention.

FIG. 4 illustrates the voice instruction recognition step (step S103 in FIG. 3) in more detail. Referring to FIG. 4, the voice instruction recognition step will be described below. Step S201 corresponds to the entrance portion of step S103. At step S202, it is determined whether the driver (not shown) has issued any voice instruction. If negative, the process proceeds to step S211 at which voice cancel flag F, voice stop flag F, voice deceleration flag F, and voice acceleration flag F are all cleared (flags←0), and then the process proceeds to step S212.

In the case where some voice instruction has been issued at step S202, the process proceeds to step S203 at which the digital comparator 17 compares the voice instruction signal provided by the analog-to-digital converter 16 in digital form with the digital value representing "CANCEL" 18b registered in the voice instruction registration unit 18. If the issued voice instruction has been identified as "CANCEL", then the process proceeds to step S204, and the voice cancel flag is set (F←1) to indicate that voice instruction "CANCEL" has been issued. Then, the process proceeds to step S212. If the decision result at step S203 is negative, then the process proceeds to step S205. Then, the issued voice instruction signal is compared with "STOP", "DECELERATE", "ACCELERATE" at steps S205, 207, 209, respectively, in a similar manner. If the signal is identified as any of these, then the process proceeds to corresponding one of steps S206, S208, S210. At each of these steps, voice stop flag F, voice deceleration flag F, or voice acceleration flag F is set (F←1) to indicate that a corresponding voice instruction has been issued. If the issued voice instruction signal is not identical to any registered instructions, then the process proceeds to step S211 at which voice cancel flag F, voice stop flag F, voice deceleration flag F, and voice acceleration flag F are all cleared (F←0), and the process proceeds to step S212. Step S212 is an exit of step S103 or the voice instruction recognition step shown in FIG. 3.

Figure 5:
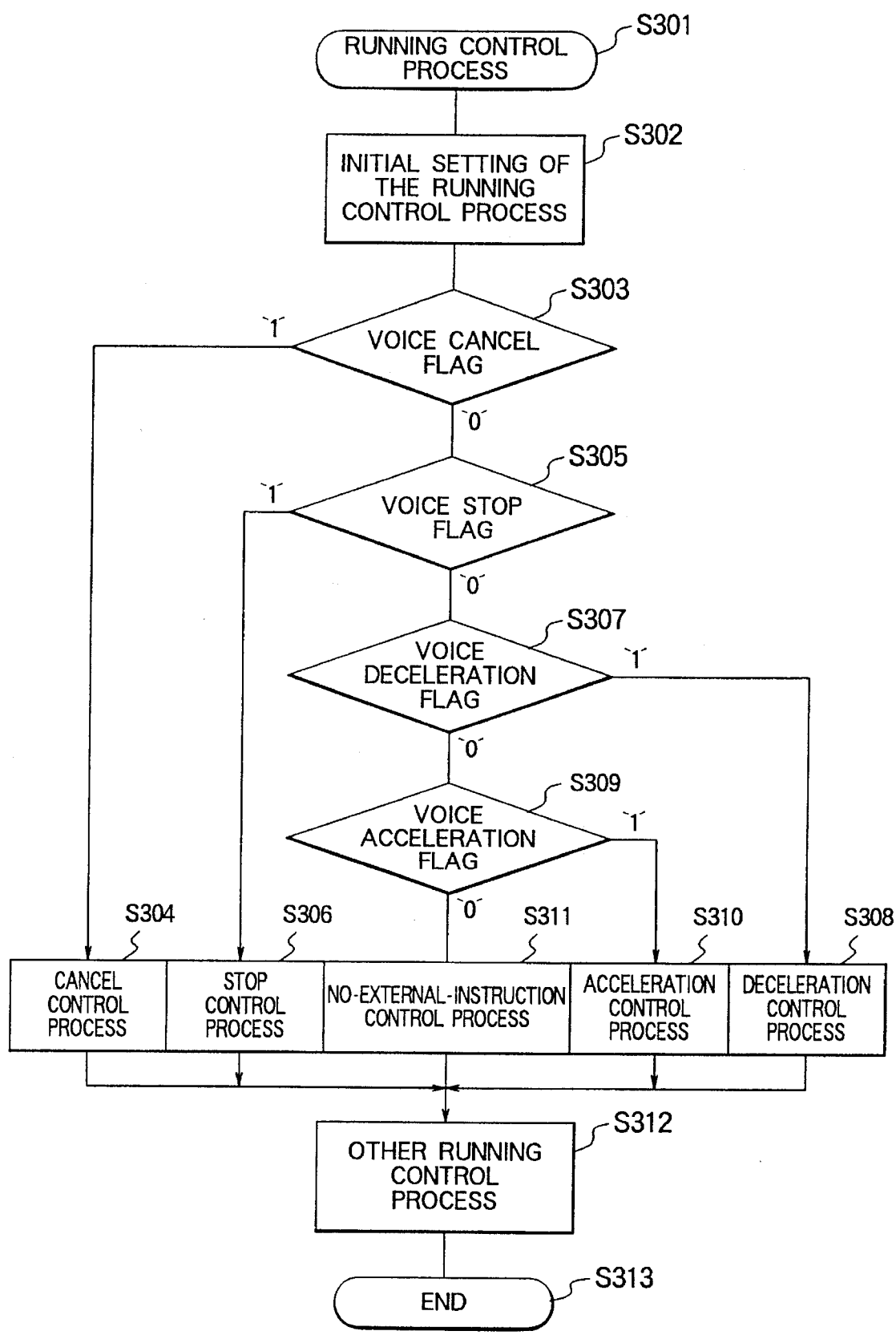
FIG. 5 is a detailed flow chart illustrating the running control process in the first embodiment according to the present invention.

FIG. 5 illustrates the running control processing step (step S104) shown in FIG. 3 in more detail. Referring to FIG. 5, this process step will be described below. Step S301 corresponds to an entrance of step S104. At step S302, initial setting associated with the running control is carried out. At step S303, the voice cancel flag F, which has been set or reset according to the voice instruction decision at step S103 of FIG. 3, is examined. If this flag is at 1, the process proceeds to step S304, and the canceling process is carried out so as to cancel the current control mode. Similarly, whether "voice stop flag F", "voice deceleration flag F", "voice acceleration flag F" have been set or reset is determined at steps S305, S307, and S309, respectively. If F=1, then the process proceeds to steps S306, S308, and S310, respectively. Stop control processing, deceleration control processing, and acceleration control processing are carried out at respective steps. If no flags have been set, the process proceeds to step S311 to perform no-external-instruction control processing, and then proceeds to step S312. At step S312, general running control processing is carried out according to other manual switch operations, and then the process proceeds to step S313.

Thus, the process is completed at step S313 that is an exit of step S104 for the running control processing shown in FIG. 3.

In embodiment 1, the voice instruction registration unit 18 includes registered digital values associated with voice instructions "STOP", "CANCEL", "ACCELERATE", and "DECELERATE". However, voice instructions registered in the voice instruction registration unit 18 are not limited only to those. For example, the voice instruction registration unit 18 may also include voice instructions for altering the control mode and set point associated with combinations of constant-speed running control (i.e., cruise control) and vehicle-to-vehicle distance control wherein the vehicle-to-vehicle distance control is performed in preference to the constant-speed running control. For example, when the constant-speed running control is done in such a manner as described above, if the distance between a vehicle and another vehicle running ahead has become less than a predetermined value, a driver may issue a voice instruction in response to an alarm so as to decrease the speed of the vehicle or to stop the acceleration process thereby maintaining the vehicle-to-vehicle distance constant.

EMBODIMENT 2

Figure 6:
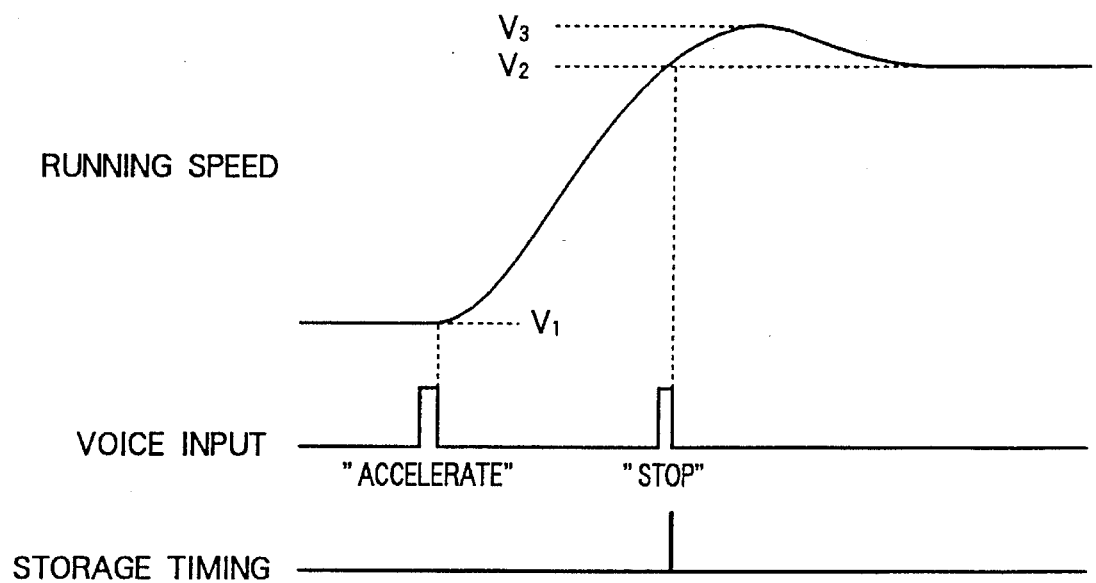
FIG. 6 is a timing chart regarding a second embodiment according to the present invention.

In embodiment 2 described below, the invention is applied to the case where a vehicle is accelerated. The main switch 5 shown in FIG. 1 is first turned on so that electric power is supplied to the control system 13, and thus the system starts its operation. If the set/coast switch 1 is manually turned off from an on-state, both target speed and actual running speed detected by the speed sensor 3 are input to the control system 13, and the controlling amount is determined from the deviation of the actual running speed from the target speed. The opening of the throttle valve 9 is controlled via the throttle actuator 7 according to the above controlling amount so that the vehicle runs at the target speed in an automatic running mode. In this state, if a voice instruction registered in advance as "ACCELERATE" is input via the microphone 11, the instruction is provided to the control system 13. The control system 13 determines the controlling amount required to gradually increase the actual running speed detected by the speed sensor 3. According to this controlling amount, the control system 13 controls the opening of the throttle valve 9 via the throttle actuator 7 so that the actual running speed is increased gradually. When it is desired to stop the acceleration, if a voice instruction registered as "STOP" is input via the microphone 11, then the instruction is input to the control system 13. The control system 13 stores the actual running speed, which is detected by the speed sensor 3 when the instruction is input, as a new target speed. Thus, the acceleration control process is completed. Then, the target speed newly set in this way and the actual running speed detected by the speed sensor 3 are input to the control system 13, and the controlling amount is determined from the deviation of the actual running speed from the target speed. The opening of the throttle valve 9 is controlled via the throttle actuator 7 according to the above controlling amount so that the vehicle runs at the target speed in an automatic running mode. In this way, the vehicle running control system performs the above-described operation according to a voice instruction given by a driver. A timing chart illustrating the operation of this embodiment is shown in FIG. 6.

Figure 10:
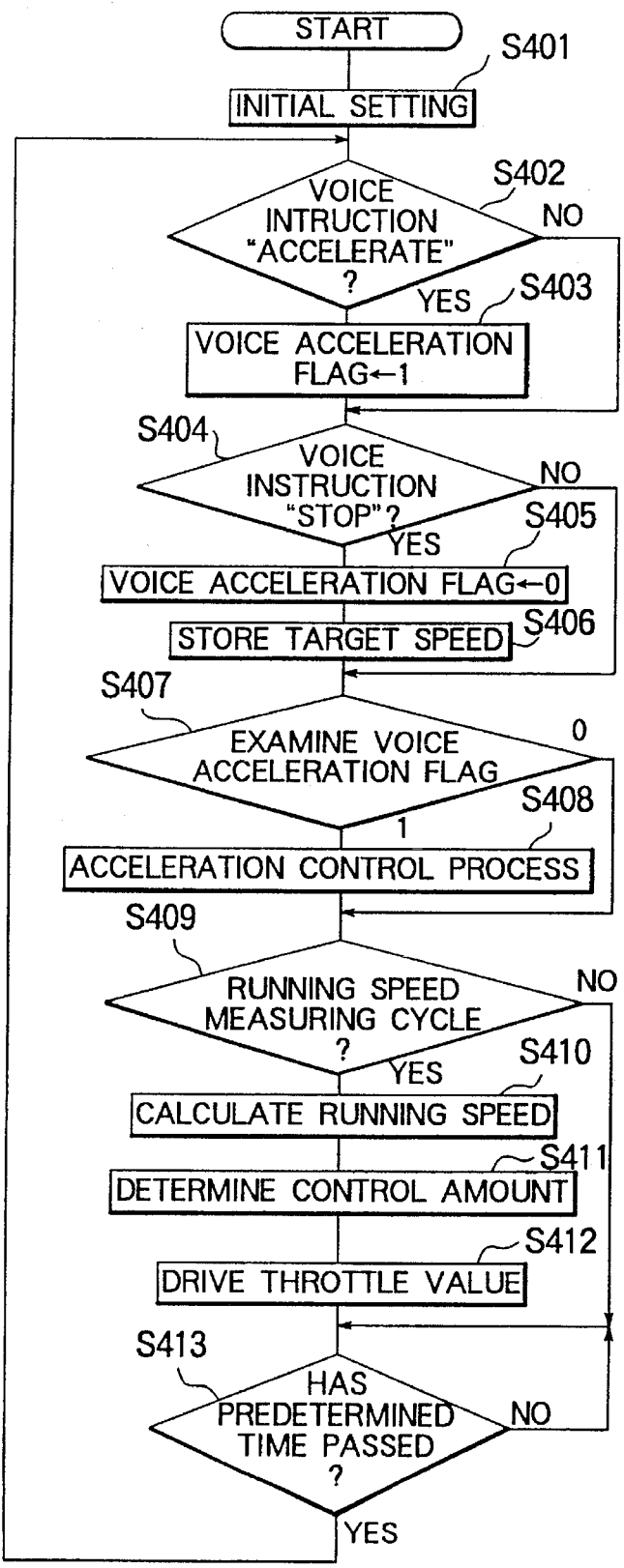
FIG. 10 is a flow chart illustrating the operation in the second embodiment according to the present invention.

FIG. 10 is a flow chart illustrating the operation of the above-described arrangement. At step S401, initial setting associated with the control system 13 is carried out. At step S402, whether a voice instruction registered as instruction "ACCELERATE" has been issued or not is determined. If a voice instruction registered as "ACCELERATE" has been issued, the process proceeds to step S403 at which voice acceleration flag F is set to 1 to indicate that the control is in the acceleration control mode. If no corresponding voice instruction has been issued, the process proceeds to step S404.

At step S404, whether a voice instruction registered as "STOP" has been issued or not is determined. If a voice instruction registered as "STOP" has been issued, the process proceeds to step S405, and voice acceleration flag F which indicates that the control is in the acceleration control mode is reset to 0. Then, the actual running speed at that time is stored as a new target speed. If no corresponding voice instruction has been issued, the process proceeds to step S407.

At step S407, voice acceleration flag F indicating that the operation is in the acceleration control mode is examined. If the operation is in the acceleration control mode (voice acceleration flag F=1), the process proceeds to step S408, and acceleration control processing is done. If the operation is not in the acceleration control mode (voice acceleration flag F=0), the process proceeds to step S409. At step S409, it is determined whether the control is in a running speed measuring cycle (sampling cycle). If positive, the process proceeds to step S410, and the actual running speed is calculated. Then, the controlling amount is determined at step S411, and the throttle actuator 7 is driven at step S412. In step S413, if a predetermined time has elapsed, then the process returns to step S402.

EMBODIMENT 3

Figure 7:
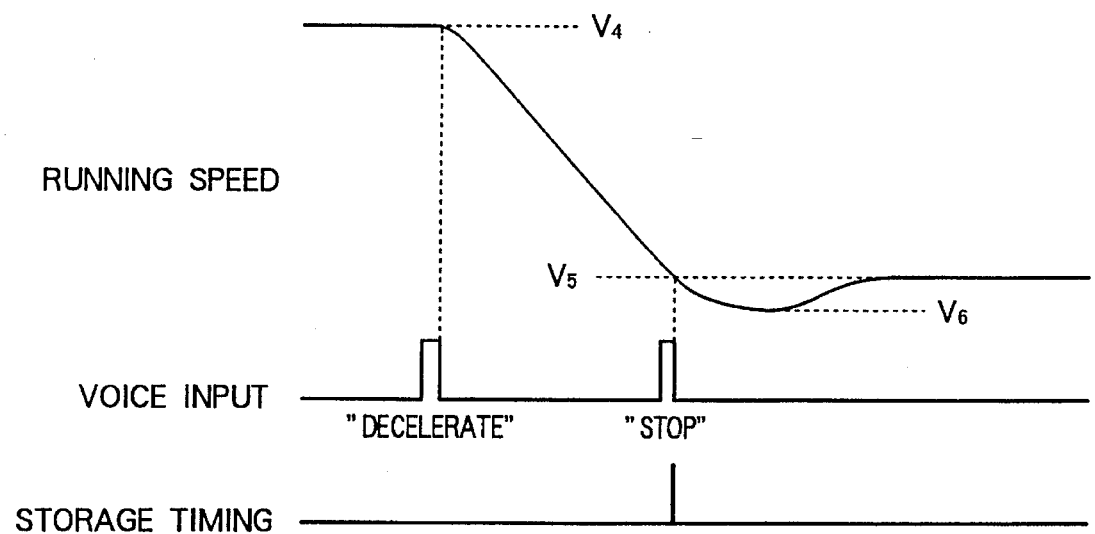
FIG. 7 is a timing chart regarding a third embodiment according to the present invention.

In embodiment 3 described below, the invention is applied to the case where a vehicle is decelerated. FIG. 7 is a timing chart illustrating the operation of embodiment 3, wherein embodiment 3 is configured in the same manner as in embodiment 2. In embodiment 3, the main switch 5 is first turned on so that electric power is supplied to the control system 13, and thus the system starts its operation. The target speed which has been set when the set/coast switch 1 is manually turned off from an on-state as well as the actual running speed detected by the speed sensor 3 are input to the control system 13, and the controlling amount is determined from the deviation of the actual running speed from the target speed. The opening of the throttle valve 9 is controlled via the throttle actuator 7 according to the above controlling amount so that the vehicle runs at the target speed in an automatic running mode. In this state, if a voice instruction registered in advance as "DECELERATE" is input via the microphone 11, this instruction is given to the control system 13. The control system 13 calculates the controlling amount required to gradually decrease the actual running speed detected by the speed sensor 3. According to this controlling amount, the control system 13 controls the opening of the throttle valve 9 via the throttle actuator 7 so that the actual running speed is decreased gradually. When it is desired to stop the deceleration, if a voice instruction registered as "STOP" is input via the microphone 11, then the stop instruction is input to the control system 13. Then, the actual running speed at the time when the instruction has been input is stored as a new target speed, and the deceleration control process is completed. The target speed newly set in this way and the actual running speed detected by the speed sensor 3 are input to the control system 13, and the controlling amount is determined from the deviation of the actual running speed from the target speed. The opening of the throttle valve 9 is controlled via the throttle actuator 7 according to the above controlling amount so that the vehicle runs at the target speed in an automatic running mode. In this way, the vehicle running control system performs the above-described operation according to a voice instruction given by a driver.

Figure 11:
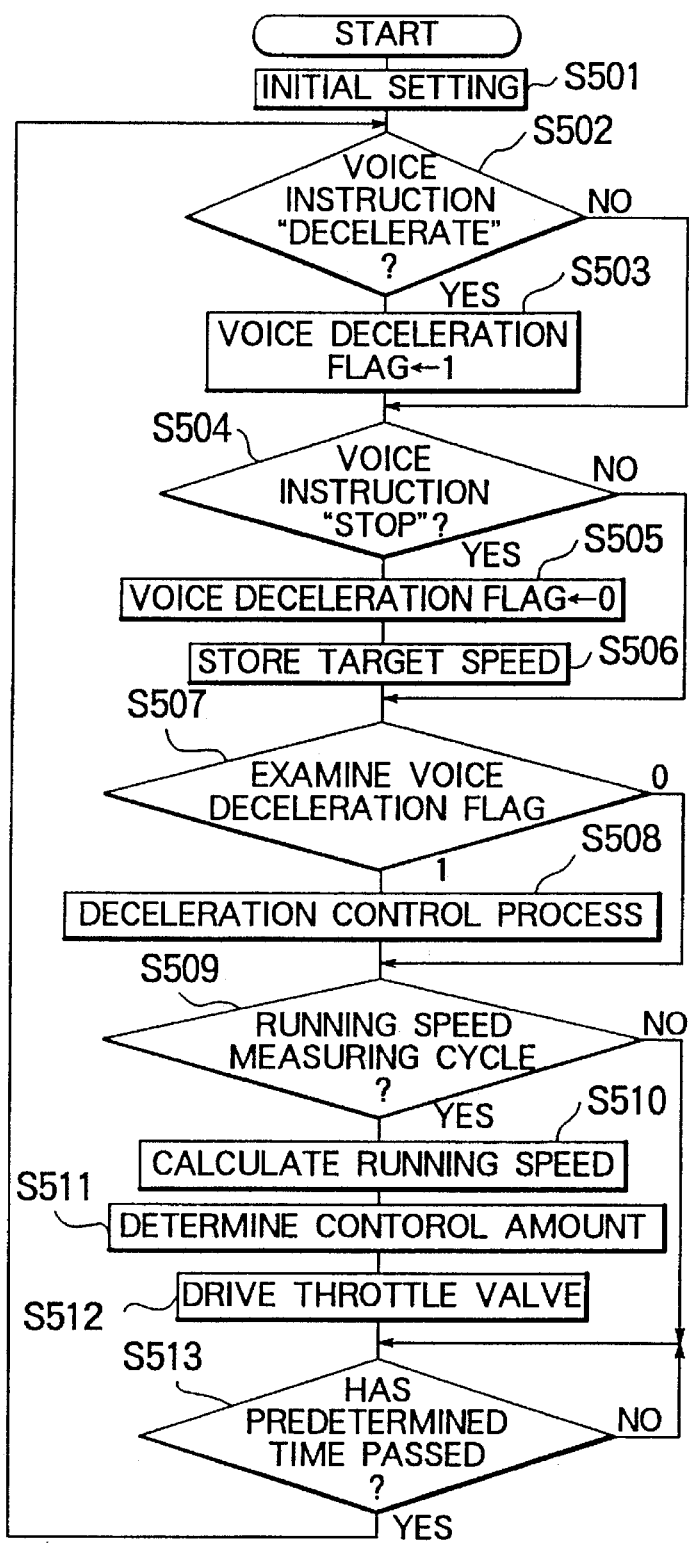
FIG. 11 is a flow chart illustrating the operation in the third embodiment according to the present invention.

FIG. 11 is a flow chart illustrating the operation described above. FIG. 11 is the same as FIG. 10 except that the deceleration control is done instead of the acceleration control.

EMBODIMENT 4

Figure 8:
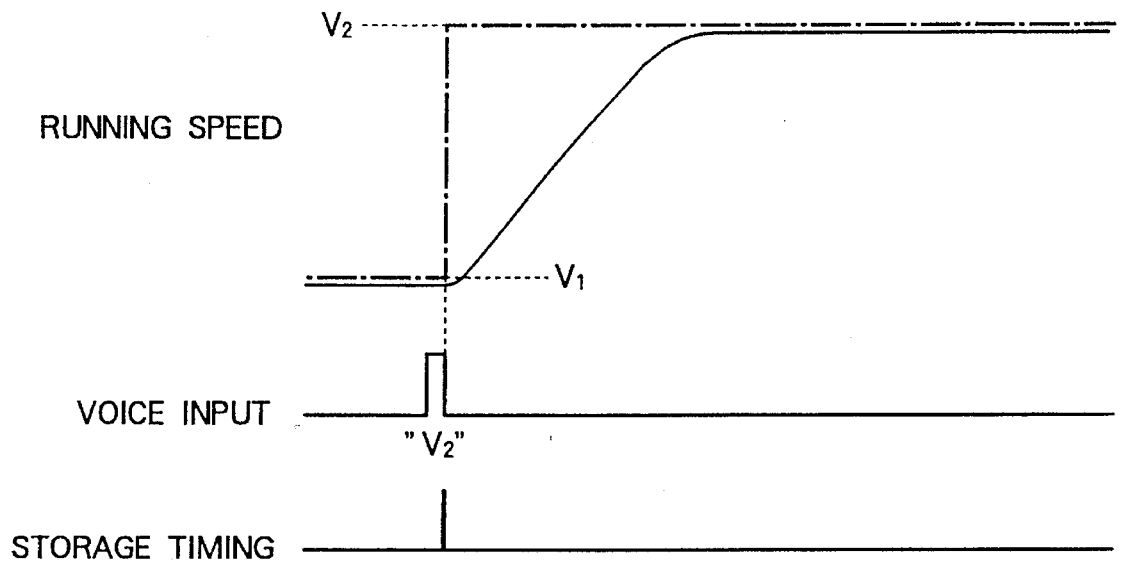
FIG. 8 is a timing chart regarding a fourth embodiment according to the present invention.

In embodiment 4 described below, the invention is applied to the case in which a vehicle is accelerated to a target speed, and then runs at a constant speed equal to the target speed. FIG. 8 is a timing chart illustrating the operation of embodiment 4, wherein embodiment 4 is configured in the same manner as in embodiment 2. In embodiment 4, the main switch 5 is first turned on so that electric power is supplied to the control system 13, and thus the system starts its operation. The target speed which has been set when the set/coast switch 1 is manually turned off from an on-state as well as the actual running speed detected by the speed sensor 3 are input to the control system 13, and the controlling amount is determined from the deviation of the actual running speed from the target speed. The opening of the throttle valve 9 is controlled via the throttle actuator 7 according to the above controlling amount so that the vehicle runs at the target speed in an automatic running mode. In this state, if a voice instruction registered as an instruction V2 for designating the target speed is input via the microphone 11, then this instruction is input to the control system 13, and the designated speed is stored as a new target speed (if the target speed>the actual running speed). At the same time, the control system 13 calculates the controlling amount required to gradually increase the actual running speed. According to this controlling amount, the control system 13 controls the opening of the throttle valve 9 via the throttle actuator 7 so that the actual running speed is increased gradually. In this case, since the target speed to be achieved is known, it is possible to determine the control amount depending on the deviation and the other conditions so that the actual running speed can converge smoothly to the target speed. According to the controlling amount determined in this way, the opening of the throttle valve 9 is controlled via the throttle actuator 7 so that the vehicle can run at the target speed in an automatic running mode. In this way, the above-described operation can be performed according to a voice instruction given by a driver without overshooting in the running speed.

EMBODIMENT 5

Figure 9:
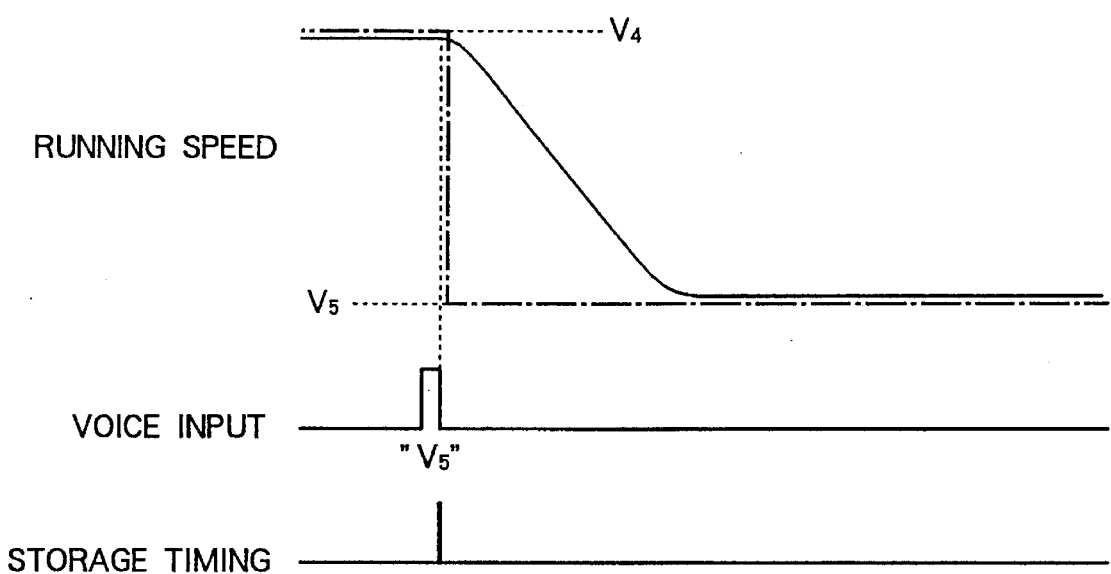
FIG. 9 is a timing chart regarding a fifth embodiment according to the present invention.

In embodiment 5 described below, the invention is applied to the case in which a vehicle is decelerated to a target speed, and then runs at this target speed. FIG. 9 is a timing chart illustrating the operation of embodiment 5, wherein embodiment 5 is configured in the same manner as in embodiment 2. In embodiment 5, the main switch 5 is first turned on so that electric power is supplied to the control system 13, and thus the system starts its operation. The target speed which has been set when the set/coast switch 1 is manually turned off from an on-state as well as the actual running speed detected by the speed sensor 3 are input to the control system 13, and the controlling amount is determined from the deviation of the actual running speed from the target speed. The opening of the throttle valve 9 is controlled via the throttle actuator 7 according to the above controlling amount so that the vehicle runs at the target speed in an automatic running mode. In this state, if a voice instruction V5 registered as an instruction for designating the target speed is input via the microphone 11, then the deceleration instruction is input to the control system 13, and the designated speed is stored as a new target speed (if the target speed<the actual running speed). At the same time, the control system 13 calculates the controlling amount required to gradually decrease the actual running speed. According to this controlling amount, the control system 13 controls the opening of the throttle valve 9 via the throttle actuator 7 so that the actual running speed is decreased gradually. Also in this case, since the target speed to be achieved is known, it is possible to determine the control amount depending on the deviation and the other conditions so that the actual running speed can converge smoothly to the target speed. According to the controlling amount determined in this way, the opening of the throttle valve 9 is controlled via the throttle actuator 7 so that the vehicle can run at the target speed in an automatic running mode. In this way, the above-described operation can be performed according to a voice instruction given by a driver without undershooting in the running speed.

Figure 12:
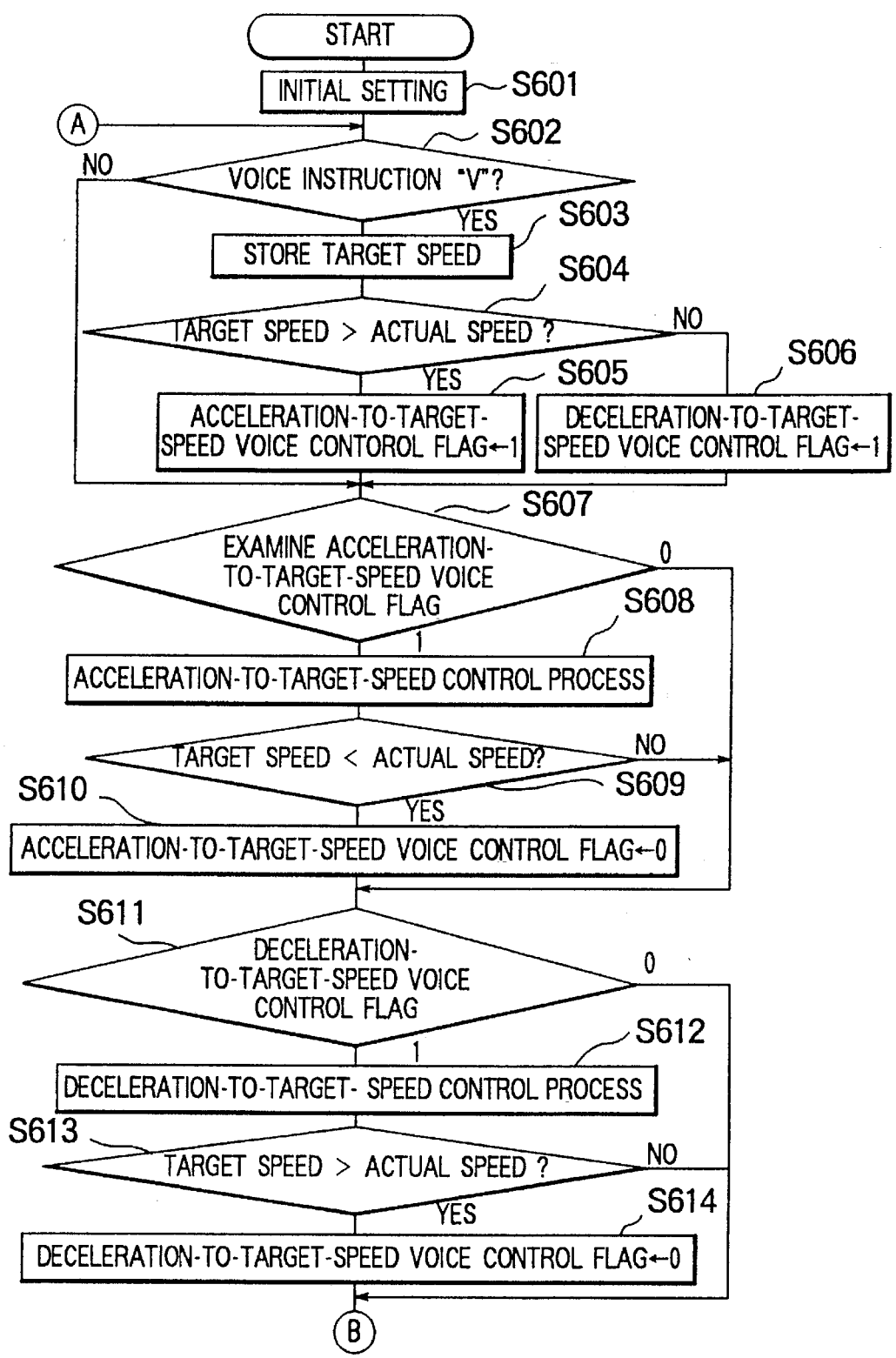
FIG. 12 is a flow chart illustrating the operation in the fourth and fifth embodiments according to the present invention.
Figure 13:
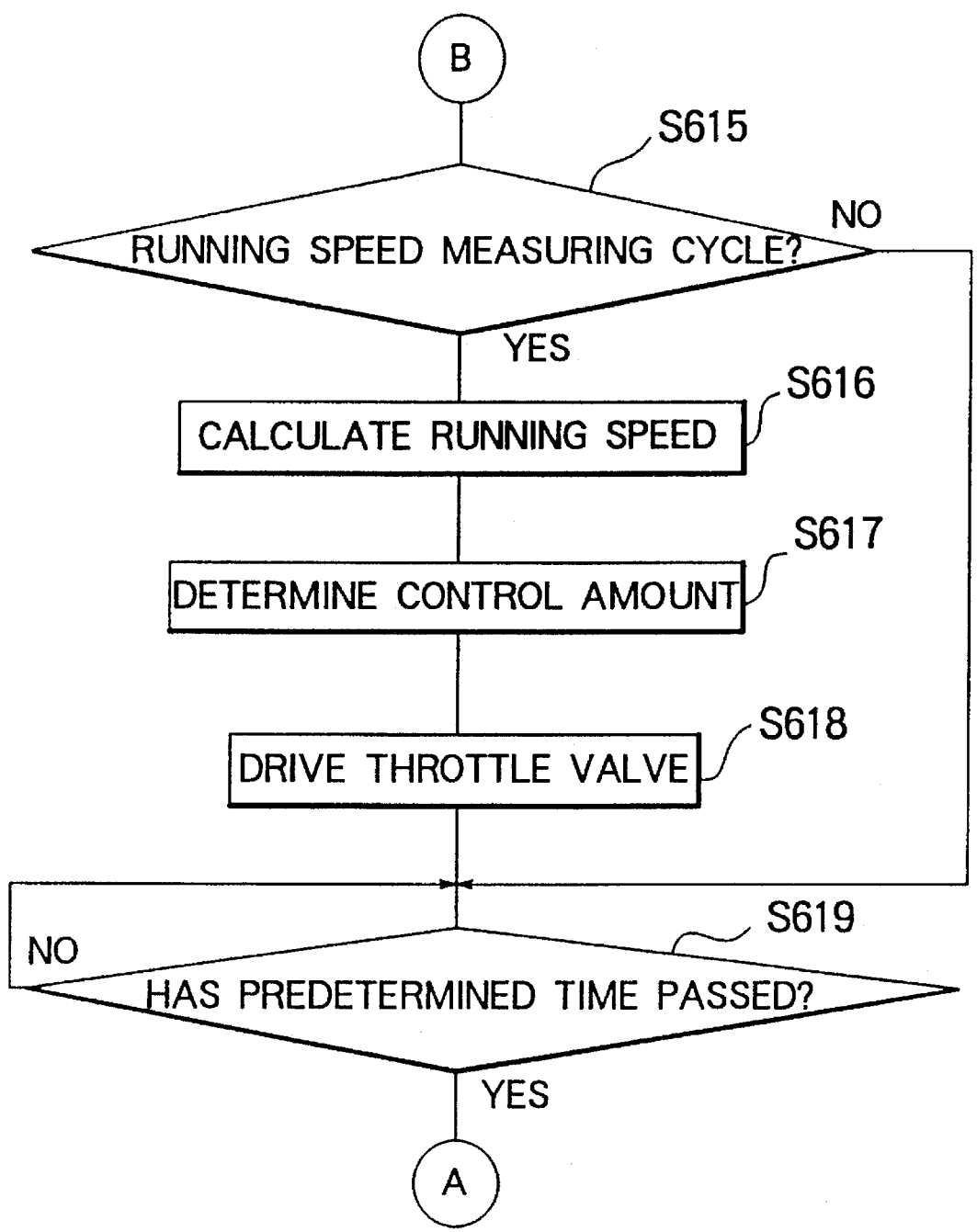
FIG. 13 is a flow chart illustrating the operation in the fourth and fifth embodiments according to the present invention.

FIGS. 12 and 13 are flow charts illustrating the operations of embodiment 4 and 5, respectively. At step S601, initial setting associated with the control system 13 is carried out. At step S602, it is determined whether a voice instruction registered as an instruction for indicating the target speed has been issued. If a voice instruction registered as an instruction for designating the target speed has been issued, then the process proceeds to step S603. If no corresponding instruction has been issued, then the process proceeds to step S607.

At step S603, a target speed designated by a voice instruction is stored in a storage area. For example, if a voice instruction designating a target speed of 90 km/h is input when a vehicle is running at 80 km/h, the content of the storage area representing the target speed is updated from 80 km/h to 90 km/h, and then a control operation to increase the running speed up to the new target speed is performed. On the other hand, if a voice instruction designating a target speed of 70 km/h is input, the content of the storage area representing the target speed is updated from 80 km/h to 70 km/h, and then a control operation to reduce the running speed down to the new target speed is performed.

At step S604, the actual running speed is compared with the target speed which has been stored at step S603. If the target speed>the actual running speed, then the process proceeds to step S605, and if the target speed≦the actual running speed, then the process proceeds to step S606.

At step S605, the target speed is changed to the value which has been designated by the voice instruction, and the acceleration-to-target-speed voice control flag F is set to 1 to indicate that the control operation to increase the running speed should be done. At step S606, the target speed is changed to the value which has been designated by the voice instruction, and the deceleration-to-target-speed voice control flag F is set to 1 to indicate that the control operation to decrease the running speed down to the target speed should be done. After that, in each case, the process proceeds to step S607.

At step S607, the acceleration-to-target-speed control flag F which may have been set at step S605 is examined. If the operation is in the acceleration-to-target-speed control mode (the acceleration-to-target-speed control flag F=1), the process proceeds to step S608 to perform acceleration control processing to achieve the target speed, and then proceeds to step S609. If the operation is not in the acceleration-to-target-speed control mode (the acceleration-to-target-speed control flag F=0), the process proceeds to step S611.

At step S609, the actual running speed is compared with the target speed which has been stored at step S603, and whether the acceleration-to-target-speed control should be terminated is determined. If the target speed≦the actual running speed, then it is concluded that the control should be terminated, and thus the process proceeds to step S6,09 at which the acceleration-to-target-speed flag F is reset to 0 to indicate that the acceleration-to-target-speed control is completed. If the target speed>the actual running speed, then it is concluded that the acceleration-to-target-speed control should be continued, and then the process proceeds to step S611.

At step S611, the deceleration-to-target-speed control flag F which may have been set at step S606 is examined. If the operation is in the deceleration-to-target-speed control mode (the deceleration-to-target-speed control flag F=1), the process proceeds to step S612 to perform deceleration control processing to achieve the target speed, and then proceeds to step S613. If the operation is not in the deceleration-to-target-speed control mode (the deceleration-to-target-speed control flag F=0), the process proceeds to step S615.

At step S613, the actual running speed is compared with the target speed which has been stored at step S603, and whether the deceleration-to-target-speed control should be terminated is determined. If the target speed≧the actual running speed, then it is concluded that the control should be terminated, and thus the process proceeds to step S614 at which the deceleration-to-target-speed flag F is reset to 0 to indicate that the deceleration-to-target-speed control is completed. If the target speed<the actual running speed, then it is concluded that the deceleration-to-target-speed control should be continued, and then the process proceeds to step S615.

At step S615, it is determined whether the control is in a running speed measuring cycle (sampling cycle). If positive, the process proceeds to step S616, and the actual running speed is calculated. Then, the controlling amount is determined at step S617, and the throttle actuator 7 is driven at step S618. In step S619, if a predetermined time has elapsed, then the process returns to step S602, and the above process will be carried out repeatedly.

EMBODIMENT 6

Figure 14:
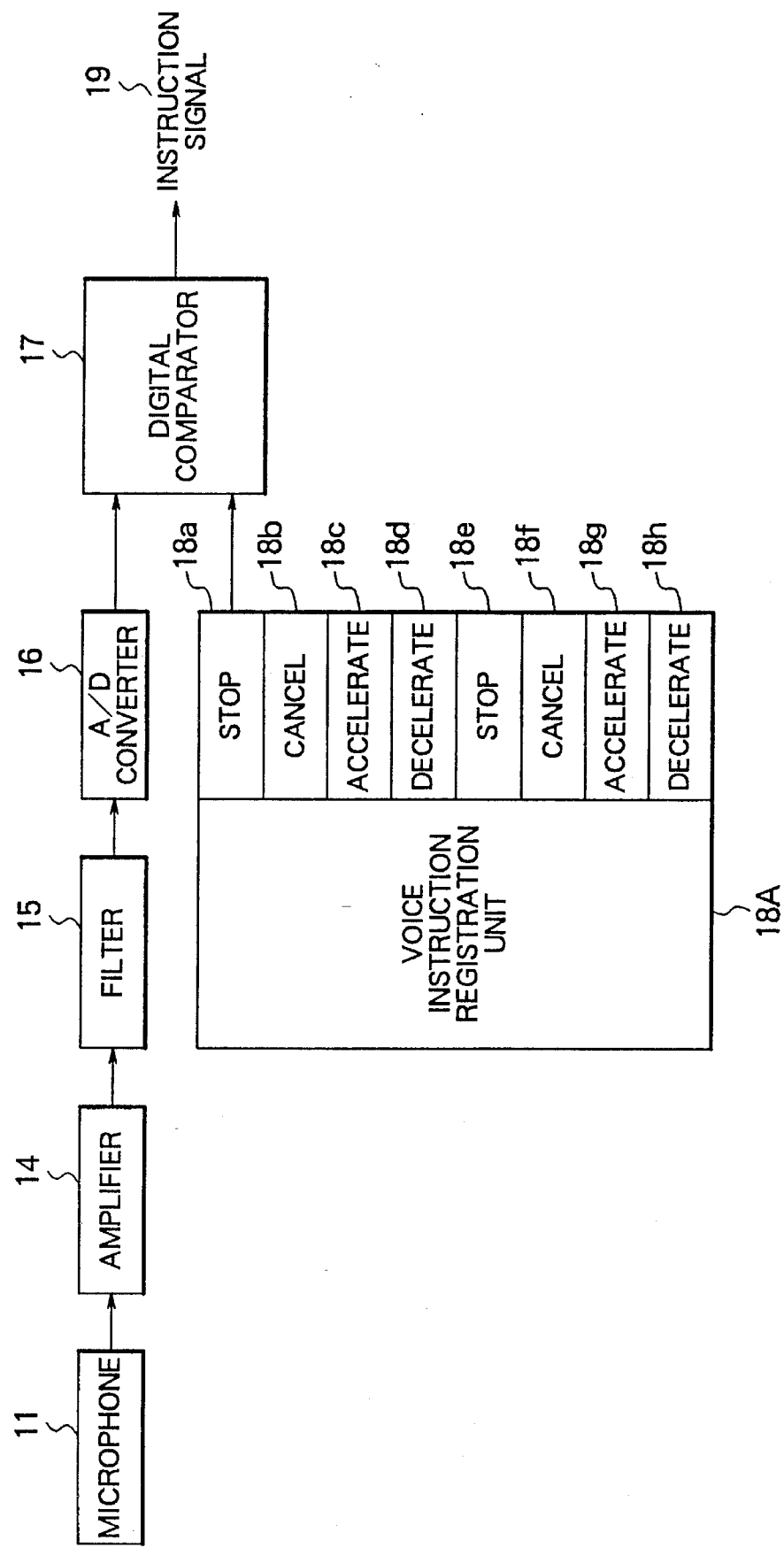
FIG. 14 is a block diagram illustrating a voice recognition unit of a sixth embodiment according to the present invention.

In embodiment 6 described below, the invention is applied to the case where the system is adapted to be accessed by a plurality of drivers. FIG. 14 is a block diagram illustrating a voice recognition unit according to embodiment 6, which corresponds to that of embodiment 1 shown in FIG. 2. In this embodiment 6, voice instruction signals for two persons, that is, "STOP" 18a through "DECELERATE" 18d for a driver A and "STOP" 18e through "DECELERATE" 18h for another driver B are registered. In a digital comparator 17, the input signal obtained by converting a voice instruction signal given by one of the above drivers into the digital signal via elements including the microphone 11 through the analog-to-digital converter 16 is compared with the above-described one or more registered data 18a through 18h registered in the voice instruction registration unit 18A one after another. The data identical to the input signal is identified as the voice instruction 19 to be carried out, and a corresponding instruction signal is output.

For example, if the driver A issues a voice instruction indicating "STOP", the input signal is converted into digital form and then compared with each of eight digital values registered in the voice instruction registration unit 18A. In this case, "STOP" 18a is identical to the given input signal, and thus "STOP" instruction signal is output as the voice instruction to be carried out. On the other hand, if the driver B issues a voice instruction indicating "STOP", this input signal is compared with each of eight digital values registered in the voice instruction registration unit 18A in the same manner as in the above case. In this case, "STOP" 18e is identical to the given input signal, and thus "STOP" instruction signal is output as the voice instruction to be carried out. Voice instruction signals indicating "CANCEL" 18b, 18f, "ACCELERATE" 18c, 18g, and "DECELERATE" 18d, 18h are processed in a similar manner.

The above operation can also be represented by FIG. 3.

Figure 15:
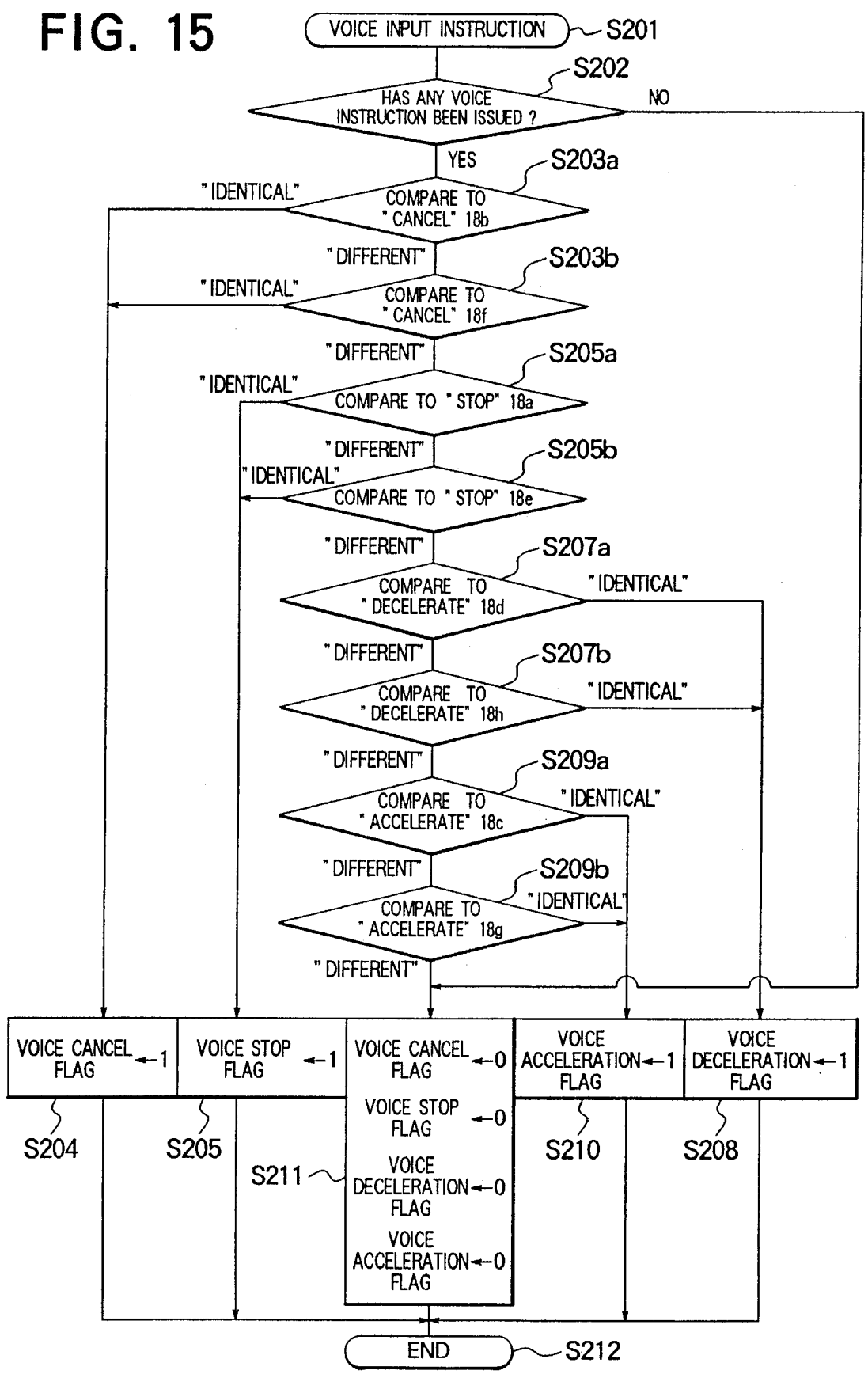
FIG. 15 is a flow chart illustrating the voice instruction input recognition process in the sixth embodiment according to the present invention.

FIG. 15 illustrates the voice instruction recognition step corresponding to step S103 in FIG. 3 in more detail. The flow shown in this flow chart is similar to that of FIG. 4, and the flow includes "cancel comparison" steps S203a, 203b, "stop comparison" steps S205a, 205b, "deceleration comparison" steps S207a, 207b, and "acceleration comparison" steps S209a, 209b wherein each step is provided separately for each driver A and B.

EMBODIMENT 7

Figure 16:
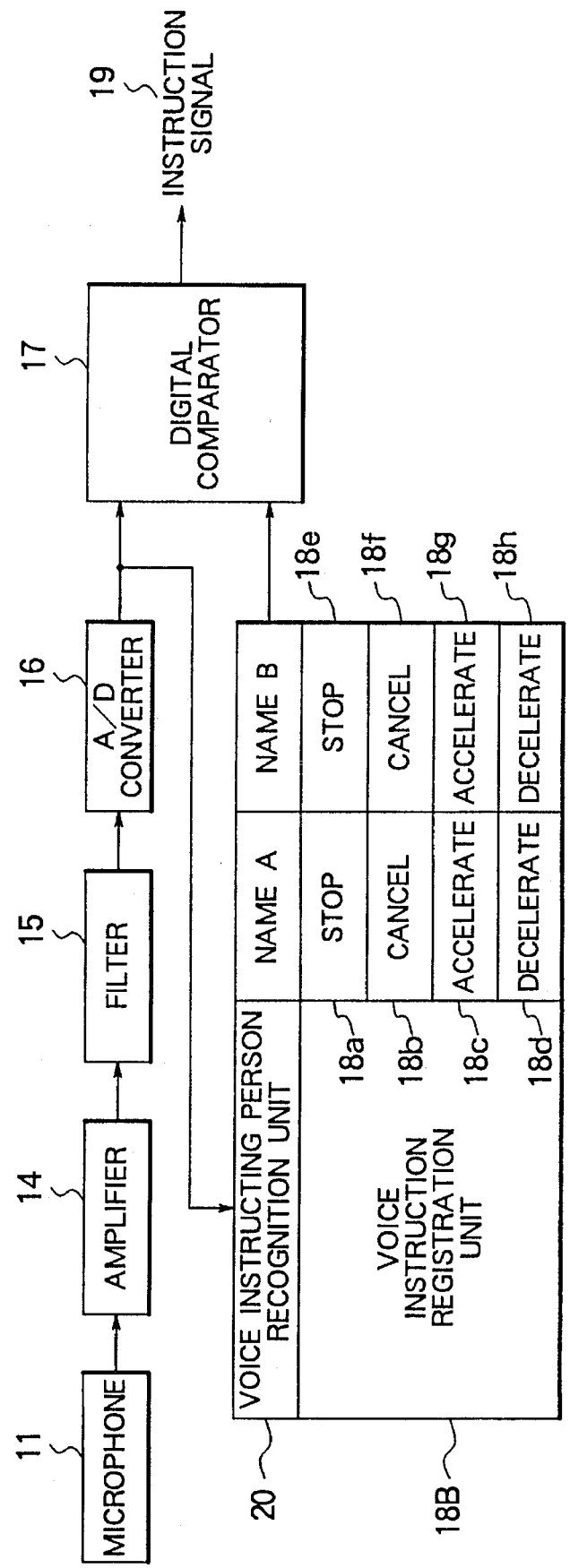
FIG. 16 is a block diagram illustrating a voice recognition unit of a seventh embodiment according to the present invention.

FIG. 16 is a block diagram illustrating embodiment 7, which corresponds to FIG. 14. As shown in FIG. 16, the voice instruction registration unit 18B includes a voice instructing person recognition unit 20 acting as a driver recognition unit. In this embodiment, a voice signal which has been converted from analog form to digital form by an analog-to-digital converter 16 is also input to the voice instructing person recognition unit 20 so that the voice instructing person is identified by voice instructing person recognition input such as a driver's name (it is assumed here that driver's names are designated by A and B). Specific registration contents for limited drivers are registered in a voice instruction registering unit 18B. The operation other than the above is carried out in the same manner as in embodiment 6.

The entire operation regarding embodiment 7 can be represented by the same flow chart as that shown in FIG. 3.

Figure 17:
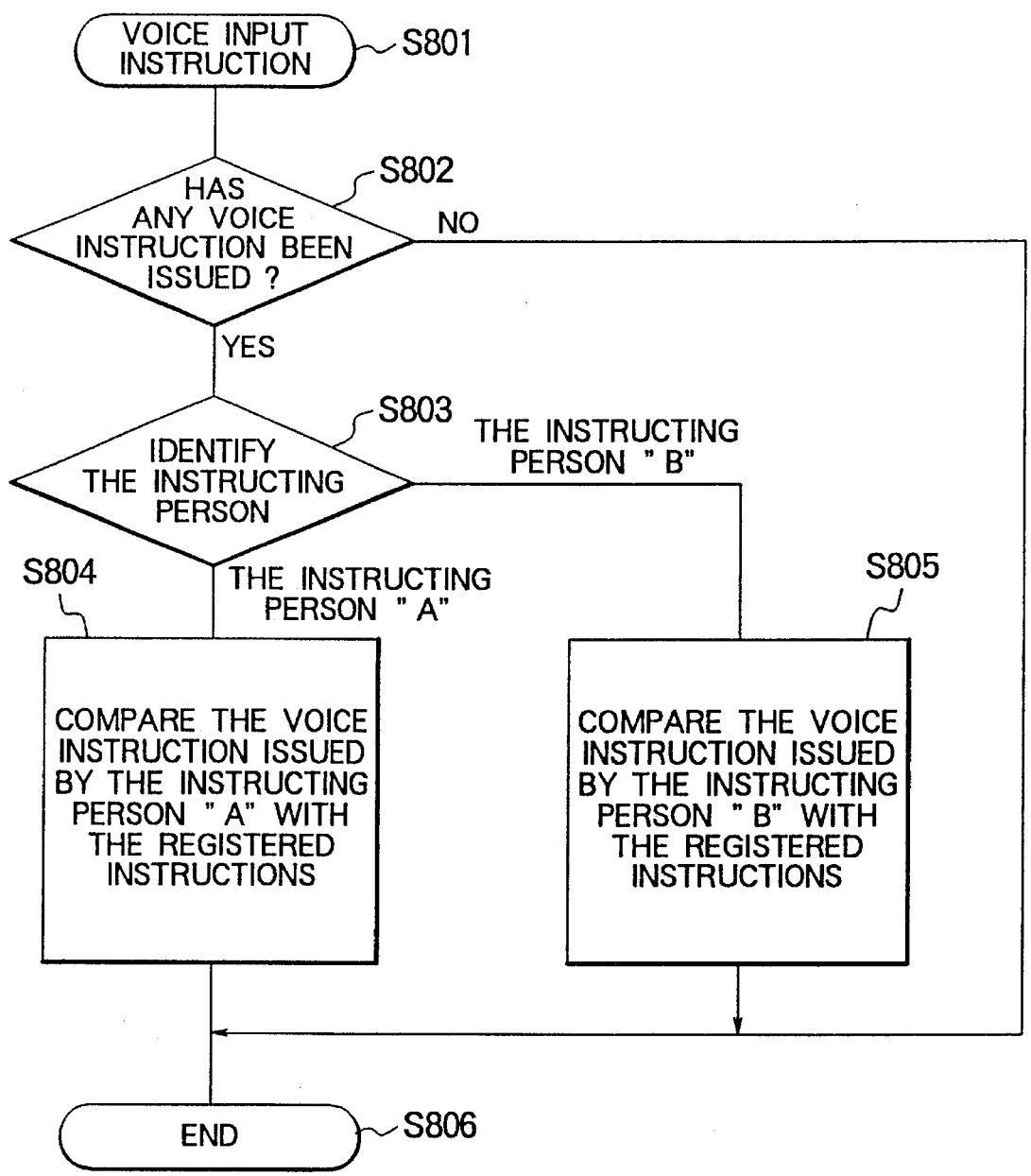
FIG. 17 is a flow chart illustrating the voice instruction input recognition process in the seventh embodiment according to the present invention.

FIG. 17 illustrates the voice instruction recognition step corresponding to step S103 in FIG. 3 in more detail. Step S801 corresponds to the entrance portion of step S103. At step S802, whether a driver has issued any voice instruction is determined. If no instruction has been issued, the process proceeds to step S806.

If it is concluded at step S802 that some voice instruction has been issued, then the process proceeds to step S803 at which the voice input of the driver is identified and whether the driver is A or B is determined. If the driver is identified as A, then the process proceeds to step A804 to recognize a voice instruction by comparing it with the registered contents such as "STOP" 18a, "CANCEL" 18b, "ACCELERATION" 18c, and "DECELERATION" 18d, in the same manner as in embodiment 6. Similarly, if the driver is identified as B, then the process proceeds to step A805 at which a voice instruction is recognized by comparing it with the registered contents such as "STOP" 18a, "CANCEL" 18b, "ACCELERATION" 18c, and "DECELERATION" 18d, in the same manner as in embodiment 6. In each case, when the process is completed, the process proceeds to step S806.

EMBODIMENT 8

Figure 18:
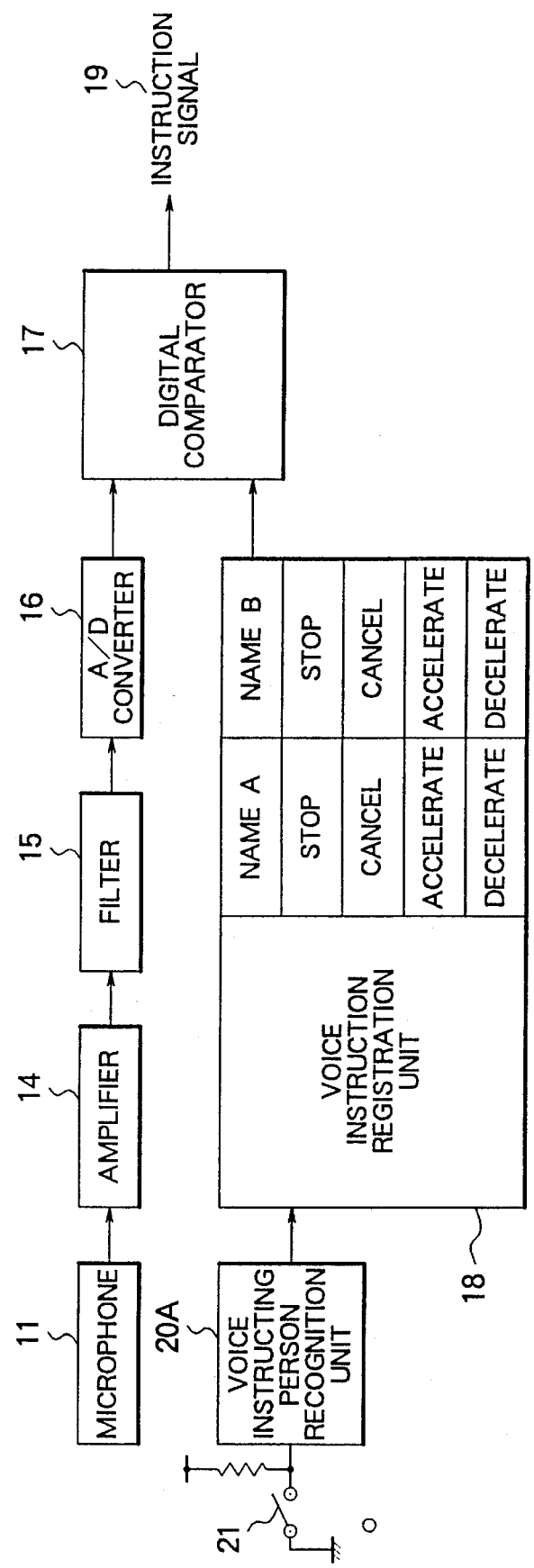
FIG. 18 is a block diagram illustrating a voice recognition unit of an eighth embodiment according to the present invention.
Figure 19:
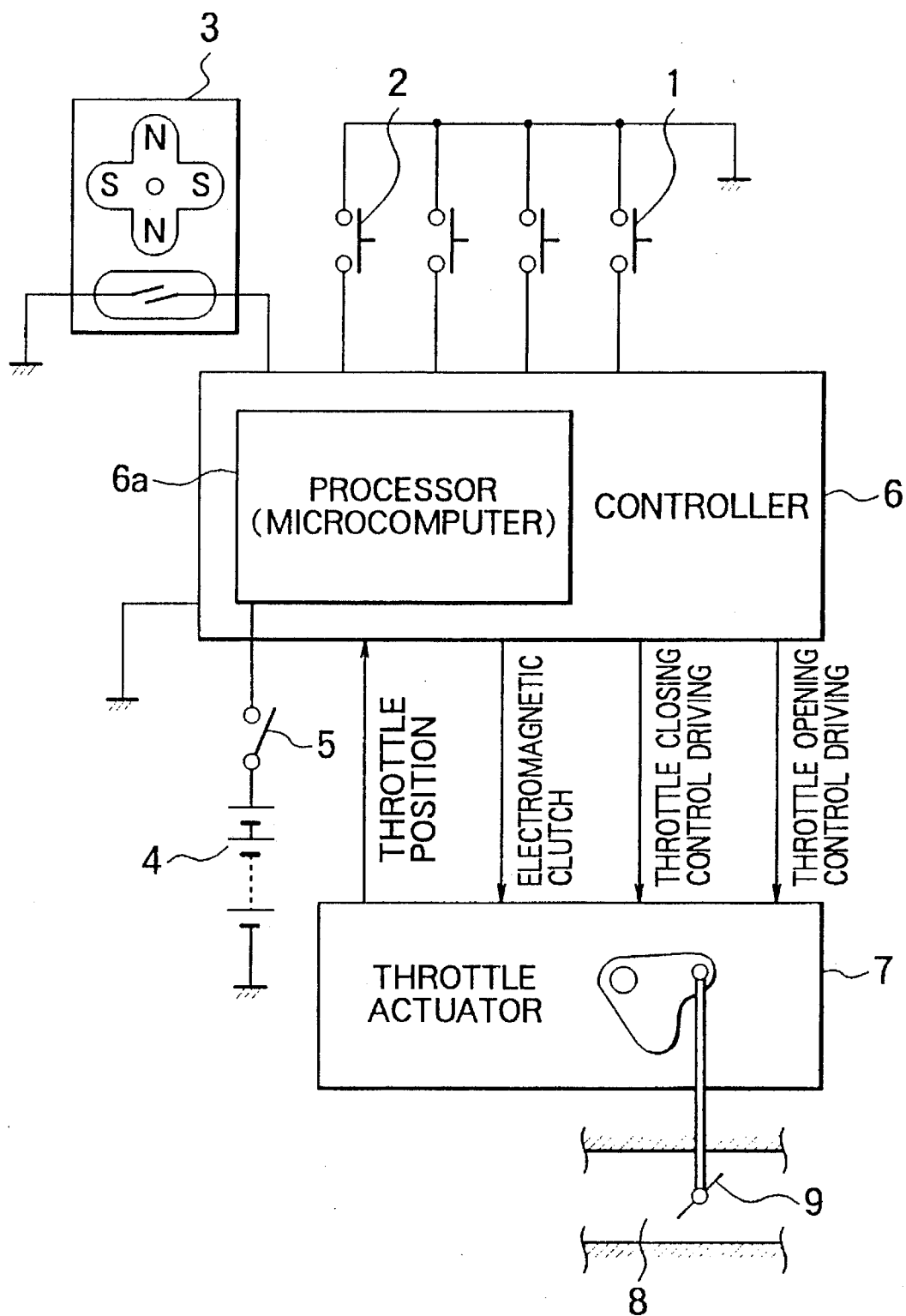
FIG. 19 is a block diagram illustrating a conventional system.
Figure 20:
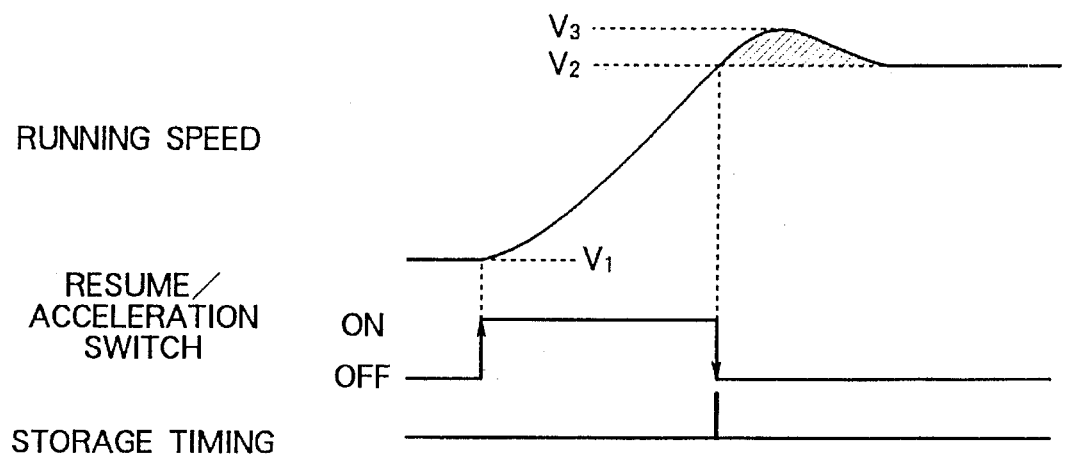
FIG. 20 is a timing chart illustrating the automatic acceleration process according to the conventional system.
Figure 21:
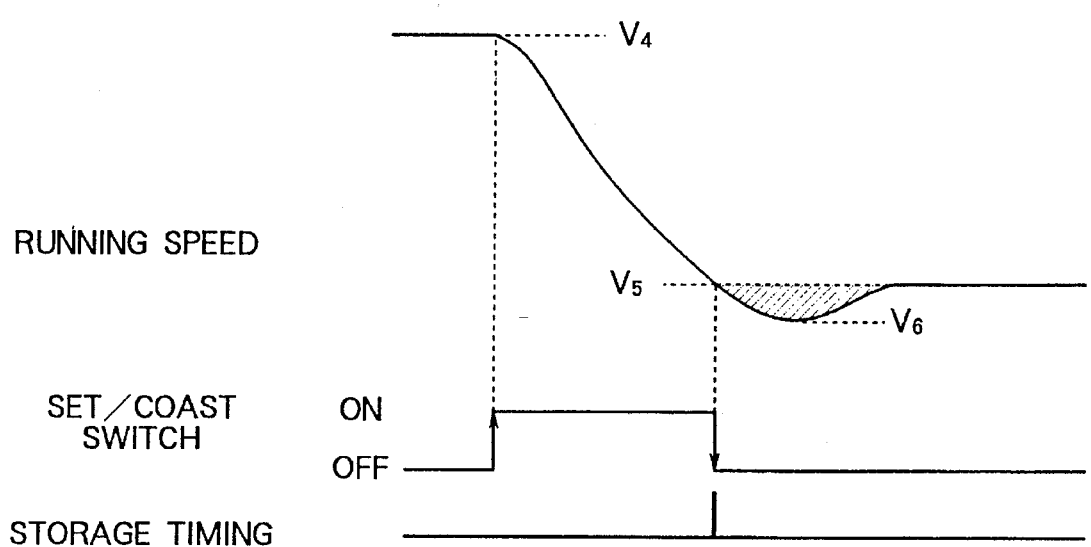
FIG. 21 is a timing chart illustrating the automatic deceleration process according to the conventional system.

In embodiment 7, drivers are identified by the voice instructing person recognition unit 20 shown in FIG. 16. In contrast, the voice instructing person recognition unit 20A of this embodiment 8 is constructed with a switch 21 as shown in FIG. 18. In embodiment 8, for example when the switch 21 is in an on-state, the voice instructing person recognition unit concludes that the driver is A, and when the switch 21 is in an off-state, it concludes that the driver is B.

EMBODIMENT 9

In embodiment 9, the voice instructing person recognition unit 20 has the switch 21 for designating a driver. However, the voice instructing person recognition unit may also be constructed in different manners. For example, a key for a vehicle may be adapted to have a special groove for identifying a voice instructing person.

In embodiments 6 through 9, it is assumed that a vehicle is used by two drivers. In the present invention, however, the number of drivers is not limited only to two. It is apparent that the invention can be applied to a greater number of drivers. Furthermore, the control is not limited only to four commands including stop, accelerate, decelerate, and cancel. The control commands may also include other commands.

What is claimed is:

1. A vehicle running speed control system, comprising:
   a) means for setting a target speed of a vehicle;
   b) means for detecting a running speed of said vehicle as an actual running speed;
   c) voice command input means for receiving a verbal target speed command from the driver;
   d) target speed instructing means including:
      1) memory means for storing in advance a plurality of driver's voice commands, each corresponding to a numerical target speed,
      2) means for matching and identifying the verbal target speed command as one of the stored numerical target speeds, and
      3) means responsive to an identification of the stored numerical target speed for changing the setting means to a new target speed corresponding to the identified numerical target speed, and
   e) means for controlling an opening of a throttle valve depending on a deviation of the actual running speed from the new target speed to implement a smooth transition from the actual running speed to the new target speed without any disruptive and potentially dangerous overshooting or undershooting.

2. A vehicle running speed control system according to claim 1, further comprising voice registering means (18) for registering voice commands of a plurality of drivers.

3. A vehicle running speed control system according to claim 2, further comprising identification means (20) for identifying driver's voices based on the registered voice commands.

* * * * *